(12) United States Patent
Forster (10) Patent No.: US 8,072,332 B2
(45) Date of Patent: *__Dec. 6, 2011__

(54) RFID TAGS WITH EAS DEACTIVATION ABILITY

(75) Inventor: Ian J. Forster, Essex (GB)

(73) Assignee: Avery Dennison Corporation, Pasadena, CA (US)

(*) Notice: Subject to any disclaimer, the term of this patent is extended or adjusted under 35 U.S.C. 154(b) by 360 days.

This patent is subject to a terminal disclaimer.

(21) Appl. No.: 11/662,428

(22) PCT Filed: Sep. 9, 2005

(86) PCT No.: PCT/US2005/031762
§ 371 (c)(1),
(2), (4) Date: Jul. 1, 2009

(87) PCT Pub. No.: WO2006/031531
PCT Pub. Date: Mar. 23, 2006

(65) Prior Publication Data
US 2009/0295583 A1    Dec. 3, 2009

Related U.S. Application Data

(63) Continuation of application No. 10/936,907, filed on Sep. 9, 2004, now Pat. No. 7,109,867.

(51) Int. Cl.
G08B 13/14      (2006.01)
(52) U.S. Cl. ............... 340/572.3; 340/572.6; 340/572.8; 340/572.5
(58) Field of Classification Search ....... 340/571–572.9; 705/16–25; 235/375; 700/225–229
See application file for complete search history.

(56) References Cited

U.S. PATENT DOCUMENTS
3,765,007 A    10/1973    Elder
(Continued)

FOREIGN PATENT DOCUMENTS
EP    0 595 549 B1    9/1997
(Continued)

OTHER PUBLICATIONS

International Search Report for corresponding PCT/US2005/031762 completed Jan. 17, 2006 by S. Sgura of the EPO.

*Primary Examiner* — Daniel Wu
*Assistant Examiner* — Son M Tang (57) ABSTRACT

A radio-frequency identification (RFID) and an electronic article surveillance (EAS) tag includes an RFID device and an EAS device. The RFID device may operate in a plurality of states including an activated state in which communication with a reader is enabled and a deactivated state in which communication with a reader is disabled. The EAS device may operate in a plurality of states including an activated state in which activation of an alarm is enabled and a deactivated state in which activation of an alarm is disable. The RFID device may be deactivated when the EAS device is deactivated. For example, the same piece of equipment that deactivates the EAS device also deactivates the RFID device at the same time. The RFID device may include an antenna, an RFID chip connected to the antenna for communicating with a reader, and an active element operatively disposed with respect to the antenna. The active element, which may include a conductive strip or lead, may have an activated state in which the antenna is enabled for communicating with a reader in a far field and a deactivated state in which the antenna is disabled from communicating with a reader in a far field. In addition, the EAS device may include a magnetic resonator and a bias magnet. When activated, the bias magnet may cause or affect the resonator to resonate and the active element to be in the activated state. Further, when deactivated, the bias magnet may cause the active element to be in the deactivated state.

23 Claims, 8 Drawing Sheets

U.S. PATENT DOCUMENTS

| | | | |
|---|---|---|---|
| 4,498,076 A | 2/1985 | Lichtblau | |
| 4,728,938 A | 3/1988 | Kaltner | |
| 4,745,401 A | 5/1988 | Montean | |
| 4,973,944 A | 11/1990 | Maletta et al. | |
| 5,081,445 A | 1/1992 | Gill et al. | |
| 5,376,778 A | 12/1994 | Kreft et al. | |
| 5,446,447 A | 8/1995 | Carney et al. | |
| 5,517,195 A | 5/1996 | Narlow et al. | |
| 5,574,431 A | 11/1996 | McKeown et al. | |
| 5,691,698 A | 11/1997 | Scholl et al. | |
| 5,939,984 A | 8/1999 | Brady et al. | |
| 5,990,794 A * | 11/1999 | Alicot et al. | 340/573.1 |
| 6,025,780 A | 2/2000 | Bowers et al. | |
| 6,067,016 A | 5/2000 | Deschenes et al. | |
| 6,100,804 A | 8/2000 | Brady et al. | |
| 6,107,920 A | 8/2000 | Eberhardt et al. | |
| 6,121,878 A * | 9/2000 | Brady et al. | 340/572.1 |
| 6,140,146 A | 10/2000 | Brady et al. | |
| 6,169,483 B1 | 1/2001 | Ghaffari et al. | |
| 6,181,245 B1 | 1/2001 | Copeland et al. | |
| 6,181,249 B1 | 1/2001 | Maitin et al. | |
| 6,204,825 B1 | 3/2001 | Wilz | |
| 6,206,292 B1 | 3/2001 | Robertz et al. | |
| 6,208,235 B1 * | 3/2001 | Trontelj | 340/10.1 |
| 6,232,870 B1 | 5/2001 | Garber et al. | |
| 6,265,977 B1 | 7/2001 | Vega et al. | |
| 6,278,413 B1 | 8/2001 | Hugh et al. | |
| 6,281,796 B1 | 8/2001 | Canipe et al. | |
| 6,335,685 B1 | 1/2002 | Schrott et al. | |
| 6,400,271 B1 | 6/2002 | Davies et al. | |
| 6,424,262 B2 * | 7/2002 | Garber et al. | 340/572.3 |
| 6,489,676 B2 | 12/2002 | Taniguchi et al. | |
| 6,496,806 B1 | 12/2002 | Horwitz et al. | |
| 6,507,279 B2 * | 1/2003 | Loof | 340/572.1 |
| 6,606,247 B2 | 8/2003 | Credelle et al. | |
| 6,752,837 B2 * | 6/2004 | Karp | 340/572.1 |
| 6,774,800 B2 | 8/2004 | Friedman et al. | |
| 6,781,508 B2 | 8/2004 | Tuttle et al. | |
| 6,891,110 B1 | 5/2005 | Pennaz et al. | |
| 7,145,459 B2 * | 12/2006 | Wu et al. | 340/572.1 |
| 7,148,804 B2 * | 12/2006 | Salesky et al. | 340/572.4 |
| 7,183,917 B2 | 2/2007 | Piccoli et al. | |
| 7,233,250 B2 * | 6/2007 | Forster | 340/572.8 |
| 7,750,792 B2 * | 7/2010 | Smith et al. | 340/10.4 |
| 7,791,489 B2 * | 9/2010 | Gelbman et al. | 340/572.8 |
| 2002/0011677 A1 | 1/2002 | Yokoi et al. | |
| 2003/0089771 A1 | 5/2003 | Cybulski et al. | |
| 2003/0136503 A1 | 7/2003 | Green et al. | |
| 2004/0004609 A1 | 1/2004 | Holman | |
| 2004/0005754 A1 | 1/2004 | Stromberg | |
| 2004/0212544 A1 | 10/2004 | Pennaz et al. | |
| 2005/0134461 A1 | 6/2005 | Gelbman et al. | |

FOREIGN PATENT DOCUMENTS

| | | |
|---|---|---|
| EP | 1 429 301 A | 6/2004 |
| WO | WO 2004/053721 A1 | 6/2004 |

* cited by examiner

RFID TAGS WITH EAS DEACTIVATION ABILITY

BACKGROUND OF THE INVENTION

The present invention relates to radio-frequency identification (RFID) systems, including RFID tags, readers, and activators. The invention also relates to electronic article surveillance (EAS) systems, including EAS tags, alarms, activators, and deactivators. The invention also relates to RFID and EAS apparatus and methodology that enables the RFID functionality of a tag to be deactivated at substantially the same time that the EAS functionality is deactivated and with the same device that deactivates the EAS functionality.

Automatic identification is the broad term applying to a host of technologies that are used to help machines identify objects. Automatic identification is often coupled with automatic data capture. Accordingly, companies that want to identify items are able to capture information about the items and to load the information into a computer with minimal human labor.

One type of automatic identification technology is radio-frequency identification (RFID). RFID is a generic term for technologies that use radio waves to automatically identify objects such as tagged products. There are several conventional methods of identifying objects using RFID, the most common of which is to store a serial number (and other information if desired) that identifies the object on a microchip that is attached to an antenna. The chip and the antenna, together with any supporting substrate, herein are called an RFID device or an RFID tag. The antenna enables the chip to transmit the identification information to a reader. The reader converts the radio waves from the RFID device into a form that can then be utilized by a computer.

As the name implies, .electronic article surveillance (EAS) is concerned with the embedding or attaching of a disposable security label or tag to a retail item to deter shoplifting. Conventional EAS devices or tags include a resonator that, when activated, causes an alarm to sound when the EAS tag is brought within operative proximity of detection apparatus (which is typically located at the exit of a store). However, if the EAS device is active, a similar signal will also be produced each time that a customer either properly removes purchased goods from the store or enters another store with similar detection apparatus. Generally, EAS tags are inexpensive and disposable items that are not removed from merchandise during check out (which is generally true for RFID tags as well). For these reasons, a variety of different techniques have been developed to deactivate EAS tags, typically by a clerk during check out using deactivation apparatus that needs no physical contact with the tag.

Various types of EAS devices and deactivation systems make use of specially configured tags or labels in connection with an apparatus for positively deactivating such tags or labels. A first example is the EAS tag described in U.S. Pat. No. 4,498,076 to Lichtblau. The Lichtblau tag is provided with a resonant circuit having a capacitor portion with an indentation that permits the resonant circuit to be deactivated according to methodology as described in U.S. Pat. No. 4,728,938 to Kaltner, for example. The Lichtblau EAS tag is readily deactivated at the point of sale by subjecting the tag or label to a relatively high-powered signal which, because of the mechanical indentation, is sufficient to cause a short circuit within the tag or label for deactivation.

Another type of EAS tag, sometimes called a magnetomechanical EAS tag, uses the technology disclosed in U.S. Pat. No. 3,765,007 to Elder. Magnetomechanical tags include an active element and a bias element. When magnetized, the bias element applies a bias magnetic field to the active element which causes the active element to be mechanically resonant at a predetermined frequency upon exposure to an interrogation signal which alternates at the predetermined frequency. This tag requires a relatively high magnetic field level for activation and deactivation. Activation and deactivation is accomplished by exciting a coil wound around a magnetic core.

One of the concerns consumers have with RFID tags is privacy. More specifically, consumers may believe that their spending habits and mobility can be tracked by means of still-active RFID tags attached to their purchases. Accordingly, to increase consumer confidence in RFID technology, manufacturers are challenged to improve RFID tags so that the tags are no longer activated by far-field RF signals once tagged products are purchased or used by consumers.

Accordingly, RFID devices and EAS devices serve different purposes when it comes to retail items. As used in the present patent application, the terms "EAS device" and "RFID device" may refer to devices that are embodied in separate tags or to devices that are combined in the same tag. By and large, each of the systems utilizes different apparatus and methodology for activation and deactivation. Therefore, retailers may need to purchase and install separate systems for implementing and deactivating RFID and EAS functionality in their stores, which can be burdensome and expensive.

In view of the foregoing, there is a need in the art for RFID and EAS technology that allows the RFID functionality of tag to be disabled easily and inexpensively. The present invention satisfies this need.

BRIEF SUMMARY OF THE INVENTION

The present invention relates to radio-frequency identification (RFID) systems, including RFID tags, readers, and activators. The invention also relates to electronic article surveillance (EAS) systems, including EAS tags, alarms, activators, and deactivators. The invention also relates to RFID and EAS devices and a methodology that enables the RFID device to be deactivated at substantially the same time as the EAS device is deactivated, using the same apparatus that deactivates the EAS functionality. The RFID device and EAS device may be implemented as or comprise of separate tags or labels or may be combined in the same tag or label.

According to one of the embodiments and by way of example only, an RFID tag may include an antenna, an RFID chip connected to the antenna for communicating with a reader, and an active element operatively disposed with respect to the antenna. The active element may operate in a plurality of states, including an activated state in which the antenna is enabled for communicating with a reader in a far field, and a deactivated state in which the antenna is disabled from communicating with a reader in a far field. The active element may change from the activated state to the deactivated state when operatively subjected to an electronic article surveillance (EAS) deactivator. Accordingly and advantageously, the same piece of equipment that deactivates the EAS device may also deactivate the RFID device. In many embodiments, the deactivation of the RFID tag may occur at the same time as an EAS device is deactivated; in other embodiments, there may be no EAS device present even though the RFID tag is deactivated.

According to another one of the embodiments and by way of example only, a dual function (RFID/EAS) tag includes an RFID device and an EAS device. The RFID device may operate in a plurality of states including an activated state in which communication with a reader is enabled and a deactivated state in which communication with a reader is disabled. The EAS device may operate in a plurality of states including an activated state in which activation of an alarm is enabled and a deactivated state in which activation of an alarm is disable. Advantageously, the RFID device may be deactivated when the EAS device is deactivated. In a number of embodiments, the same piece of equipment that deactivates the EAS device also deactivates the RFID device at the same time. For example, a deactivator that subjects the EAS device to a magnetic field may also subject the RFID device to the magnetic field.

In a number of embodiments, the RFID device may include an antenna, an RFID chip connected to the antenna for communicating with a reader, and an active element operatively disposed with respect to the antenna. The active element, which may include a conductive strip or lead, may have an activated state in which the antenna is enabled for communicating with a reader in a far field and a deactivated state in which the antenna is disabled from communicating with a reader in a far field. In addition, the EAS device may include a magnetic resonator and a bias magnet. When activated, the bias magnet may cause or affect the resonator to resonate and the active element to be in the activated state. Further, when deactivated, the bias magnet may cause the active element to be in the deactivated state. Accordingly, in a retail example, deactivating the EAS device at check out also deactivates the RFD device. The tag may include structure for providing a visual indication to a consumer that the RFD functionality of the tag has been deactivated.

Other features and advantages of the present invention will become apparent to those skilled in the art from a consideration of the following detailed description taken in conjunction with the accompanying drawings.

DETAILED DESCRIPTION OF THE INVENTION

Figure 1:
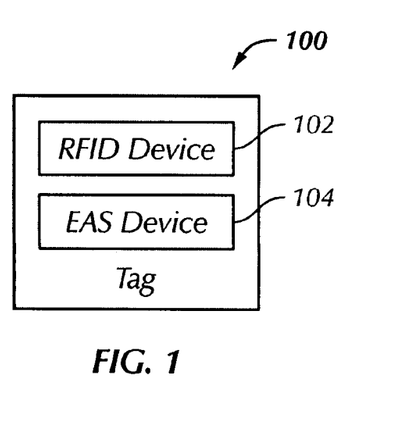
FIG. 1 is a block diagram of a tag with both radio-frequency identification (RFID) functionality and electronic article surveillance (EAS) functionality according to a number of embodiments.

Referring more particularly to FIG. 1 of the drawings, in a number of embodiments a radio-frequency identification (RFID) and an electronic article surveillance (EAS) tag 100 may include an RFID device 102 and an EAS device 104. According to a many embodiments, the tag 100 may operate in a plurality of operating states. In addition, in other embodiments, the process of deactivating the EAS functionality of the tag 100 may simultaneously deactivate the RFID functionality of the tag 100.

Figure 2:
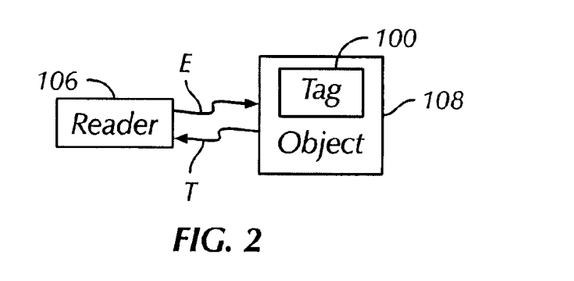
FIG. 2 illustrates a tag with at least RFID functionality in an activated state.

For example, in some of the embodiments, the tag 100 may operate in an activated state in which the tag 100 is able to communicate with an RFID reader 106 as shown in FIG. 2. More specifically, when in an activated state, the RFID device 102 of the tag 100, which is associated with an object 108, may be able to receive energy E from the reader 106 for activation and to transmit tag energy T back to the reader 106 for processing. The communication of information from the tag 100 to the reader 106 may be within a typical far-field installation, e.g., in a retail store. Accordingly, in an activated state, the combination tag 100 may function or operate at least as a typical RFID tag in the far field and in many embodiments as a typical EAS tag as well. [The term "far field" as used herein refers to a distance greater than about 15 mm from an RF-energy emitting device, such as an RFID device that emits ultra-high frequency (UHF) RF energy.]

Figure 3:
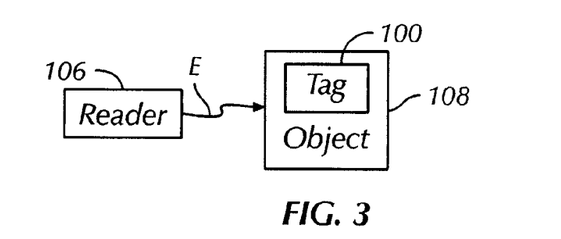
FIG. 3 illustrates a tag with at least RFID functionality in a deactivated state.

In other embodiments, the tag 100 may also operate in a deactivated state in which the tag 100 is disabled from communicating with a reader 106 as shown in FIG. 3. More specifically, when in a deactivated state, the RFID device 102 of the tag is not able to communicate with a reader 106 in a far-field installation. Accordingly, in a deactivated state, the combination tag 100 may not function or operate at least as a typical RFID tag in the far field and in many embodiments as a typical EAS tag as well.

Figure 4:
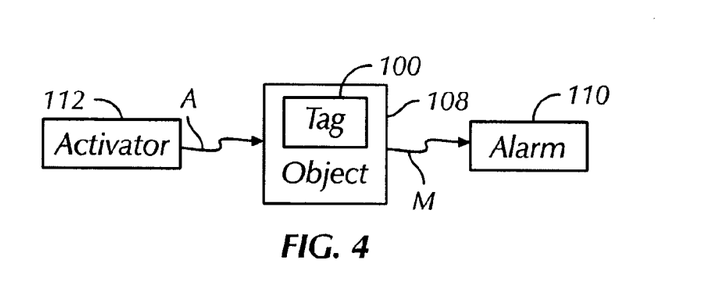
FIG. 4 illustrates a tag with combined RFID and EAS functionality in an activated state.

Regarding the states with respect to EAS functionality as illustrated in FIG. 4, the tag 100 may be taken from an inactive state in which the EAS device 104 will not trigger an EAS alarm 110 to an active state by subjecting the EAS device 104 to activation energy A from an activator 112. When in an active state, the EAS device 104 will activate the alarm 110 when positioned within an operative field of the alarm 110, with is indicated by energy M.

Figure 5:
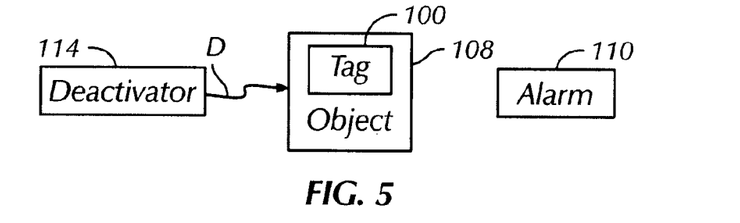
FIG. 5 illustrates a tag with combined RFID and EAS functionality in a deactivated state.

In addition, the tag 100 may be taken from the active state to the deactivated state by subjecting the EAS device 104 to deactivation energy D from a deactivator 114 as illustrated in FIG. 5. When in the deactivated state, the EAS device 104 will not activate the alarm 110 when positioned within the operative field thereof. According to many of the embodiments, the process of deactivating the EAS device 104 of the tag 100 may also simultaneously deactivate the RFID device 102, which is discuss in more detail below.

Figure 6:
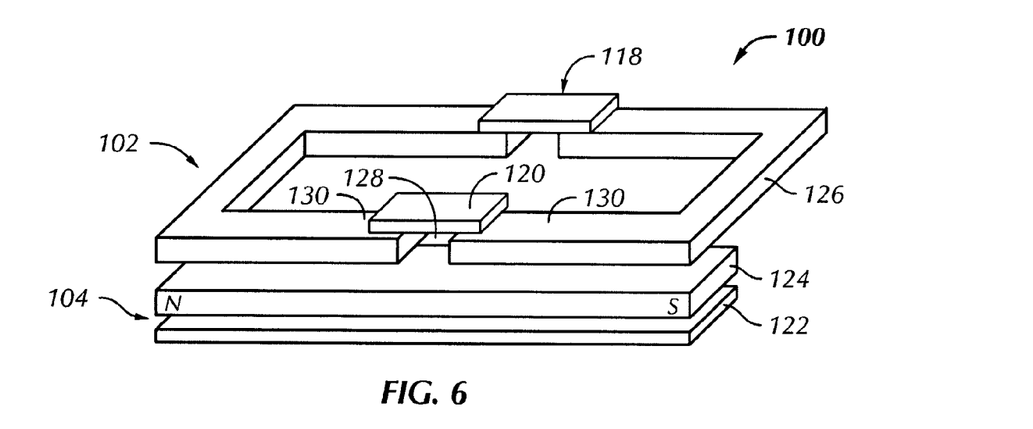
FIG. 6 illustrates a combined RFID and EAS tag according to a number of embodiments.

According to a number of embodiments as shown in FIG. 6, the RFID device 102 of the combination tag 100 may include an antenna 116, an RF chip 118, and an active element 120. The RF chip may be connected to the antenna 116 and may be configured for communicating with a reader 106. The active element 120 may be operative disposed with respect to the antenna 116. For example, the active element 120 may be configured to affect, vary, or change one or more far-field operating parameters of the antenna 116, such as frequency or efficiency.

In a number of embodiments, the active element 120 may be configured to change states or to change the operating state of the RFID device 102. For example, when the active element 120 is in an activated state, the antenna 116 may be enabled for communicating with a reader 106 in an operative far field, as represented in FIG. 2. In addition, when the active element 120 is in a deactivated state, the antenna is disabled from communicating with a reader 106 in an operative far field, as represented in FIG. 3.

Figure 7:
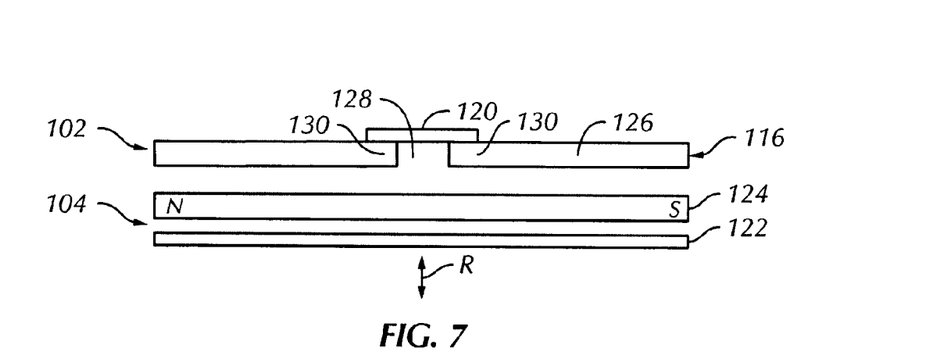
FIG. 7 illustrates the tag of FIG. 6 in an activated state.
Figure 8:
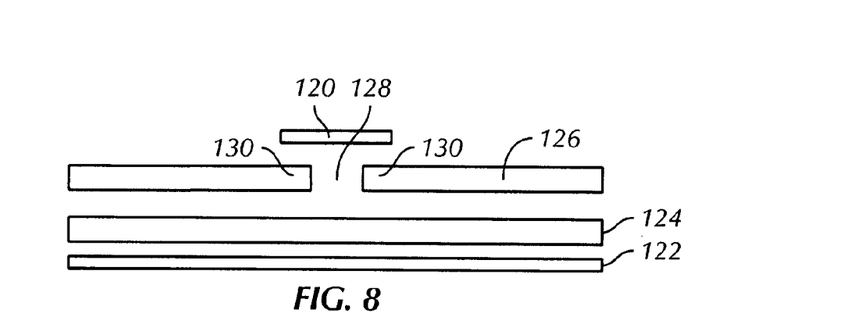
FIG. 8 illustrates the tag of FIG. 6 in a deactivated state.

According to a number of embodiments, the EAS device 104 may include a magnetic resonator 122 and a bias magnet 124 that may be activated and deactivated as represented in FIGS. 4 and 5, respectively. Accordingly, when activated, the bias magnet 124 may cause the resonator 122 to resonate as shown by arrow R in FIG. 7. When the bias magnet 124 is deactivated, the resonator 122 is unable to resonate as shown in FIG. 8.

In some of the embodiments, when activated, the bias magnet 124 may cause the active element 120 to be in the activated state, thereby enabling the RFID device 102 to communicate with a reader 106 in the far field. In other embodiments, when deactivated, the bias magnet 124 may cause the active element 120 to be in the deactivated state, thereby disabling the RFID device 102 from communicating with a reader 106 in the far field. Accordingly, by demagnetizing the bias magnet 124, both the EAS functionality and the RFID functionality of the tag 100 is disabled or deactivated.

For example, in a number of embodiments, the antenna 116 may include a loop antenna 126 with a gap 128 defined between ends 130 of the antenna 126, and the active element 120 may include a conductive strip. Accordingly, when in the activated state as shown in FIG. 7, the conductive strip 120 may be positioned in operative proximity with the gap 128, for example, contacting the ends 130 of the loop antenna 126, thereby enabling the antenna 126 to operate at desired or functional far-field parameters. When in the deactivated state as shown in FIG. 8, the conductive strip 120 may not be not positioned in operative proximity with the gap 128, thereby disabling the antenna 126 from operating at desired or functional far-field parameters.

More specifically, in the illustrated embodiments, the gap 128 of the antenna 126 may be positioned between the conductive strip 120 and the bias magnet 124 such that the conductive strip may be attracted by the magnet 124 and urged toward the gap 128 when the bias magnet 124 is activated. In some of the embodiments, the conductive strip 120 may be biased away from the gap 128, such as at the position shown in FIG. 8, such that when the bias magnet 124 is deactivated, no magnetic force acts upon the conductive strip 120, and the conductive strip 120 may move out of operative proximity of the antenna 126, or away from, the gap 128.

Also in the embodiments illustrated in FIGS. 6, 7, and 8, when the conductive strip 120 is in the activate state and in operative proximity of the antenna 126, a capacitance between the ends 130 of the antenna 126 and across the gap 128 may be at an increased level, thereby enabling the antenna 126 to operate at a desired frequency or efficiency. Further, when the conductive strip 120 is in the deactivated state and out of operative proximity of the antenna 126, the capacitance across the gap 128 may be at a reduced level, thereby disabling the antenna 126 from operating at a desired frequency or efficiency.

Accordingly, the active element in the form of the conductive strip 120 may cause the antenna 126 to operate at a reduced efficiency when in the deactivated state. In addition, the conductive strip 120 may cause the antenna 126 to operate at a first frequency when in the activated state and at a second frequency when in the deactivated state. The first frequency may enable the antenna 126 to communicate with a reader 106 in a far field, and the second frequency may enable the antenna 126 to communicate with a reader 106 only in a near field (i.e., not at a far field).

Figure 9:
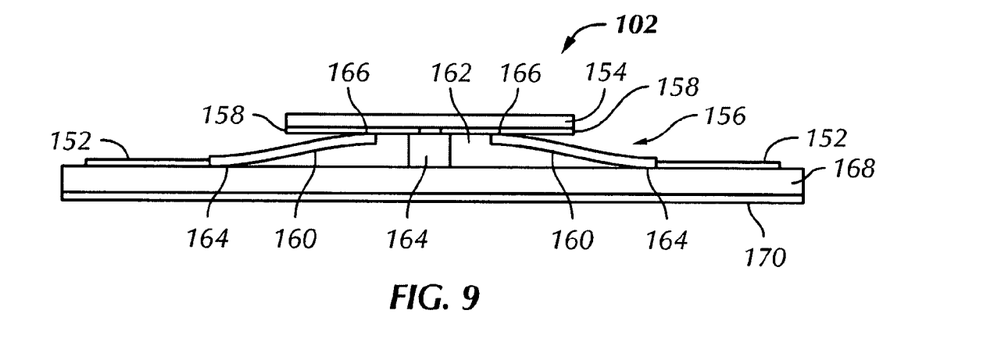
FIG. 9 illustrates an RFID device of a combined RFID and EAS tag according to some of the embodiments, particularly illustrating the RFID device in an activated state.

According to still other embodiments, an RFID device .102 as illustrated in FIG. 9 may include an antenna 152, an RFID chip 154, and an active element 156 connected to the antenna 152. The chip 154 may include a pair of conductive magnetic pads 158. The active element 156 may be operatively disposed with respect to the pads 158. Accordingly, in a number of embodiments the active element 156 may have an activated state in which the antenna 152 is in operative or electrical communication with the chip 154 as represented by FIG. 2 and shown in FIG. 9. Further, the active element 156 may have a deactivated state in which antenna 152 is not in operative or electrical communication with the chip 154 as represented by FIG. 3 and as shown in FIG. 10.

More specifically, the active element 156 may include a pair of conductive leads 160 each connected to the antenna 152 at one end thereof. Each of the leads 160 may then contact a respective one of the pads 158 at the other end thereof when in the activated state as shown in FIG. 9. In addition, the leads 160 may also disconnect from the pads 158 when in the deactivated state as shown in FIG. 10. In a number of embodiments, the pads 158 may be activated when magnetized as represented in FIG. 4 and deactivated when demagnetized as represented in FIG. 5. Accordingly, in embodiments in which a tag 100 combines RFID and EAS functionality, the deactivation process of the EAS device 104 may also simultaneously deactivate the RFID device 102.

Figure 10:
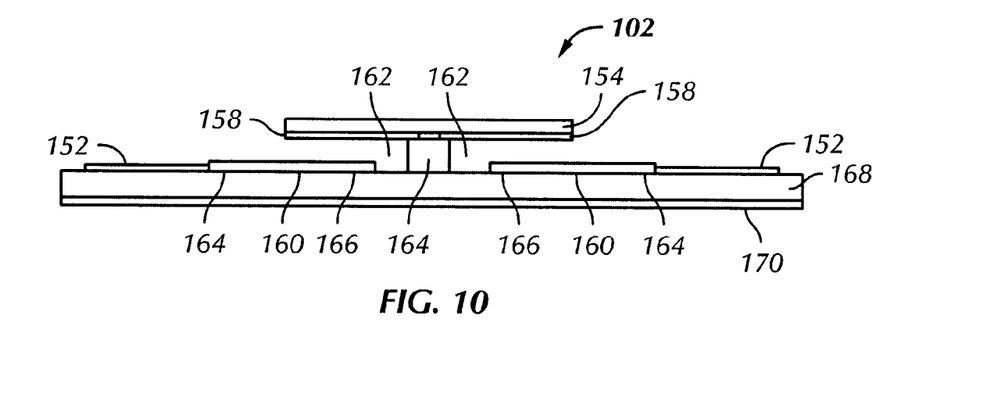
FIG. 10 illustrates the RFID device in a deactivated state.

In still other embodiments, the conductive leads 160 may be biased to be in the deactivated state as shown in FIG. 10. Accordingly, to place the RFID device 102 in the activated state, the magnetic pads 158 may attract the free ends of the leads 160 to make contact therewith. When the pads 158 are demagnetized, then the leads 160 may disconnect from the pads 158 to return to the biased position of FIG. 10.

In some of the embodiments, the chip 154 may be disposed in a spaced relationship with the antenna 152 such that a gap 162 is defined between the antenna 152 and the pads 158. For example, a support 164 may be provided on which the chip 154 may be mounted. Accordingly, each of the conductive leads 160 may be connected to the antenna 152 at respective first ends 164 thereof. Further, each of the conductive leads 160 may then be movable in the gap 162 at respective free or second ends 166 thereof to disconnect from a respective one of the pads 158. In still other embodiments, the RFID device 102 may include a dielectric support 168 with a rear ground plane 170 on which the antenna 152 may be mounted.

Figure 11:
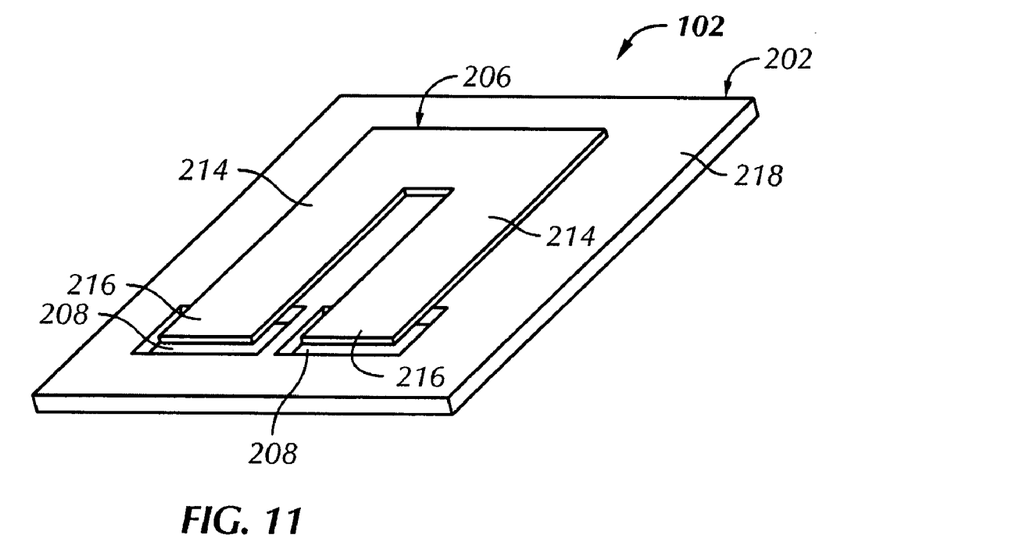
FIG. 11 illustrates an RFID device of a combined RFID and EAS tag according to other embodiments, particularly illustrating one side of the RFID device.
Figure 12:
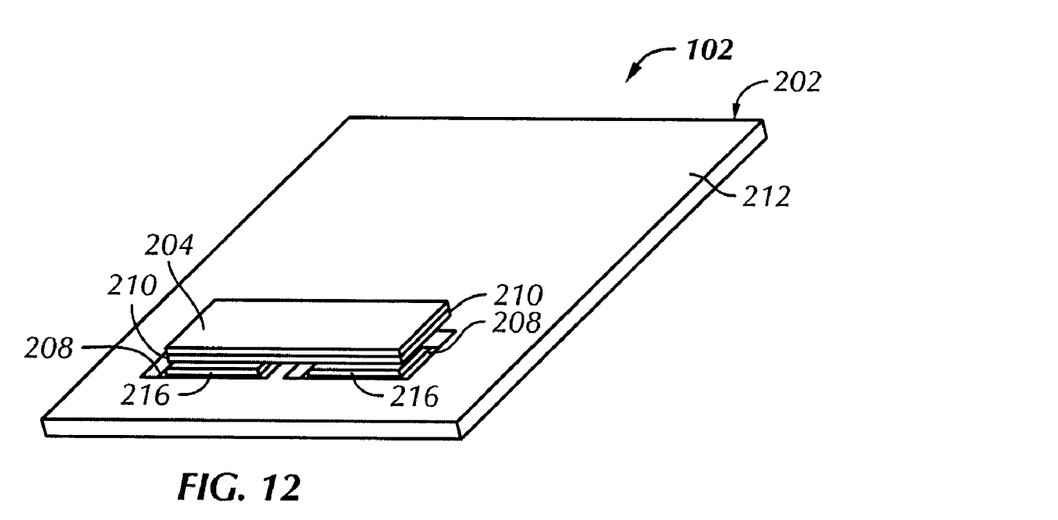
FIG. 12 illustrates the other side of the RFID device of FIG. 11.

According to further embodiments, an RFID device 102 as illustrated in FIGS. 11 and 12 may include a substrate 202, an RFID chip 204, and an antenna 206. The substrate 202 may include at least one aperture 208, with a pair of apertures 208 being shown in the embodiment in the drawings. The chip 204 may include a number of conductive magnetic pads 210 corresponding to the apertures 208, with the pads 210 being disposed at the apertures 208 on a first side 212 of the substrate 202. The antenna 206 may include a pair of arms 214 each with an end 216 disposed at a respect one of the apertures on a second side 218 of the substrate 202.

Figure 13:
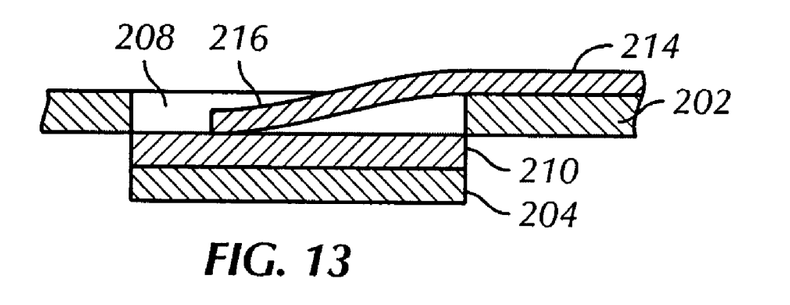
FIG. 13 is a cross-sectional view illustrating the RFID device of FIG. 11 in an activated state.
Figure 14:
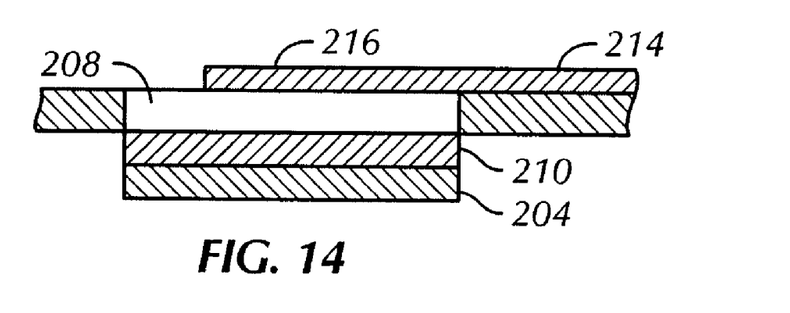
FIG. 14 is a cross-sectional view illustrating the RFID device of FIG. 11 in a deactivated state.

In a number of embodiments, the antenna 206 may include a plurality of operating states. For example, the antenna 206 may include an activated state in which the ends 216 of the arms 214 are in operative or electrical communication with the pads 210 as shown in FIG. 13, thereby rendering the RFID device 102 in an active state as represented in FIG. 2. In addition, the antenna 216 may include a deactivated state in which the ends 216 of the arms 214 are not in operative or electrical communication with the pads 210 as shown in FIG. 14, thereby rendering the RFID device 102 in a deactivated state as represented in FIG. 3. Accordingly, in embodiments in which a tag 100 combines RFID and EAS functionality, the process of deactivating the EAS device 104 may also simultaneously deactivate the RFID device 102.

As shown in FIG. 12, in some of the embodiments, the arms 214 of the antenna 206 may be biased to be separated or disconnected from the pads 210. Accordingly, when the pads 210 are magnetized, the ends 216 of the arms 214 are drawn to the pads 210 against the bias of the arms 214 as shown in FIG. 11. When the pads 210 are demagnetized, then the arms 214 return to the biased open or disconnected position as shown in FIG. 12.

Figure 15:
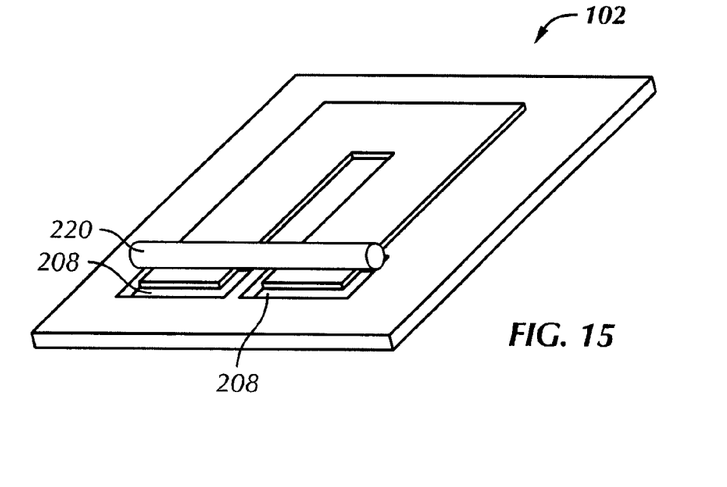
FIG. 15 illustrates an RFID device of a combined RFID and EAS tag according to still other embodiments.
Figure 16:
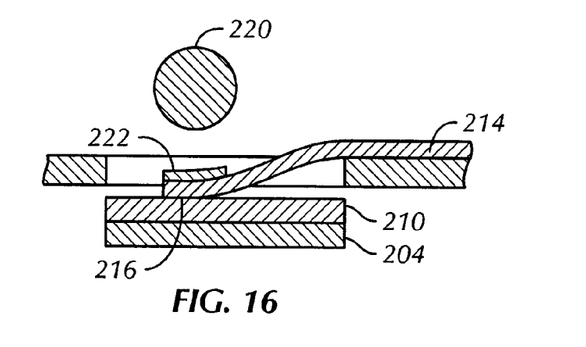
FIG. 16 is a cross-sectional view illustrating the RFID device of FIG. 15 in an activated state.
Figure 17:
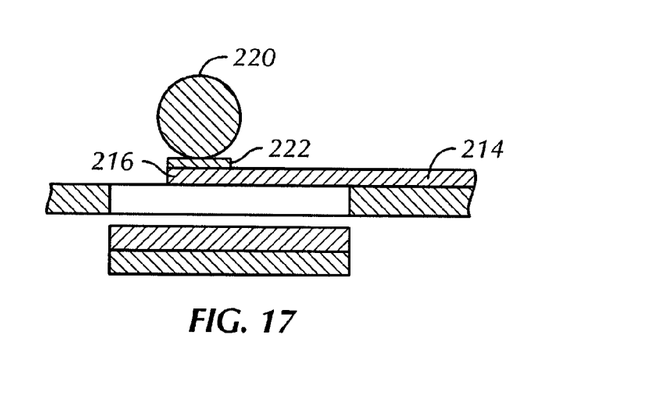
FIG. 17 is a cross-sectional view illustrating the RFID device of FIG. 15 in a deactivated state.

In some of the embodiments, the RFID device 102 may include structure for providing an indication whether the RFID device 102 is in an activated or deactivated state. For example, as shown in FIGS. 15 and 16, a lens 220 may be disposed at the apertures 208, and the end 216 of each of the arms 214 may include a colored section 222. Accordingly, when the RFID device 102 is in an activated state as shown in FIG. 16, the colored sections 222 are separated from the lens 220, so that the lens 220 provides a first visual indicator, i.e., activated. And when the RFID device 102 is in a deactivated state as shown in FIG. 17, the colored sections 222 are positioned adjacent to the lens 220, so that the lens 220 provides a second visual indicator, i.e., deactivated.

Although the invention is illustrated above with references to tags having combined RFID and EAS functionality (i.e., embodying both an RFID device and an EAS device), the deactivation methodology of the invention applies equally to the case of an RFID device and an EAS device each embodied in a separate tag marking an object. In this case, the physical relationship of the tags (e.g., proximity, configurations, etc.) can affect the use of the single deactivation apparatus to deactivate both devices.

Figure 18:
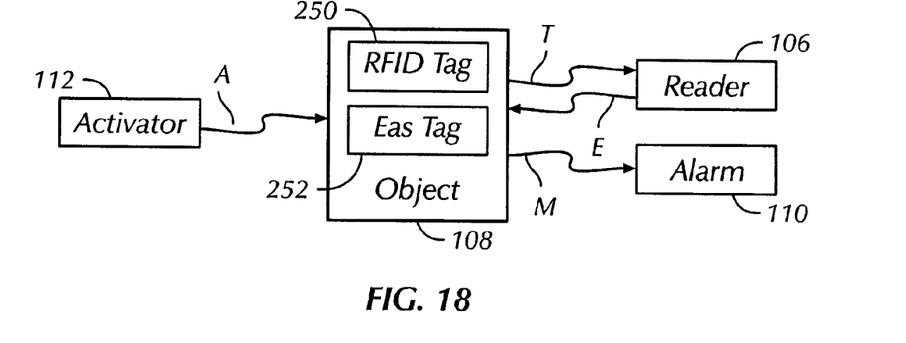
FIG. 18 is a block diagram illustrated an embodiment of individual RFID and EAS tags associated with an object, particularly illustrating an activated state.
Figure 19:
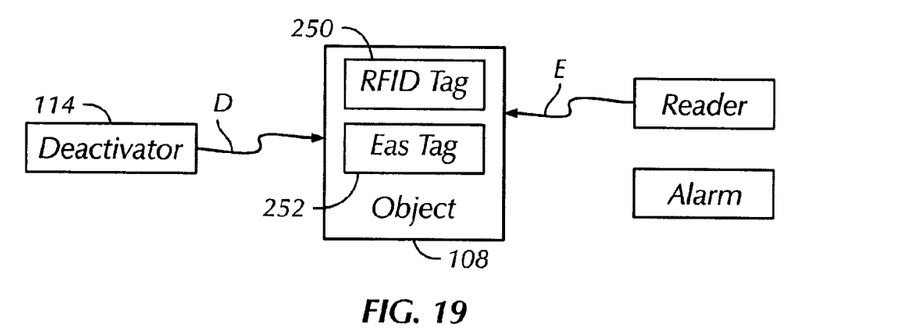
FIG. 19 is a block diagram illustrating the embodiment of FIG. 18 in a deactivated state.

Referring to FIGS. 18 and 19, in addition to a tag 100 with combined RFID and EAS functionality, according to a number of embodiments, individual RFID and EAS tags 250 and 252, respectively, may be associated with an object 108. The RFID and EAS tags 250 and 252 may be configured analogously to or may include analogous functionality as the RFID and EAS devices 102 and 104, respectively, as described above.

In some of the embodiments, the tags 250 and 252 may be activated individually and at separate times with either the same activator 112 or with separate activating apparatus. Alternatively, the tags 250 and 252 may be activated substantially simultaneously with the same activator 112 as shown in FIG. 18. In other embodiments, the tags 250 and 252 may be deactivated at substantially the same time and with the same deactivating apparatus 114 as shown in FIG. 19. For example, during a purchase of an item 108, the readability or operability of the RFID tag 250 may be disabled with the same apparatus that deactivates the EAS tag 252 and at the same time that the EAS tag 252 is deactivated.

Figure 20:
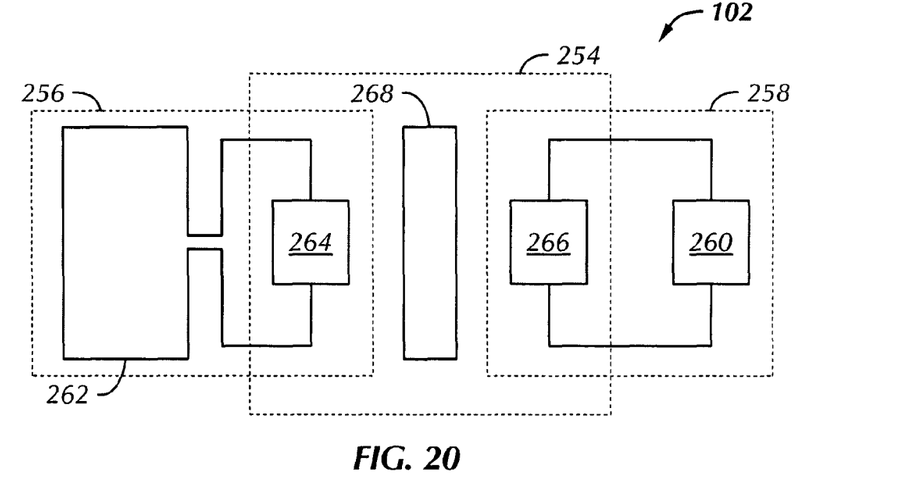
FIG. 20 schematically illustrates one of the embodiments of an RFID device.

According to a number of embodiments, the RFID device 102 may be of a type shown in FIG. 20. In these embodiments, the RFID device 102 may include a magnetic coupler 254 operatively coupling together an antenna portion 256 and an interposer 258 with a transponder chip 260. The interposer 258 includes conductive leads or pads that are coupled to contact pads of the chip 260 for providing a larger effective electrical contact area than ICs precisely aligned for direct placement without an interposer.

The antenna portion 256 may include an antenna 262 and an antenna portion magnetic coupling element 264 electrically coupled together. The electrical coupling between the antenna 262 and the antenna portion magnetic coupling element 264 may be a direct electrical (conductive) coupling or a non-direct reactive coupling, such as capacitive coupling. The antenna 262 may be any of a variety of suitable antennas for receiving and/or sending signals in interaction with an RFID communication device such as a reader.

The interposer 258 may include the transponder chip 260 and an interposer magnetic coupling element 266 that is electrically coupled to the chip 260. The coupling between the transponder chip 260 and the interposer magnetic coupling element 266 may be a direct electrical contact or may include certain types of reactive coupling, such as capacitive coupling. The magnetic coupling elements 264 and 266 together constitute the magnetic coupler 254. The interaction of the magnetic coupling elements 264 and 266 allows transfer of energy between the antenna 262 and the transponder chip 260 via magnetic coupling.

In some of the embodiments, the magnetic coupler 254 may include high-permeability material placed in proximity to the magnetic coupling elements 264 and 266. Ferrites are an example of suitable materials for the high-permeability material 254. Ferrites are ceramic materials generally containing iron oxide combined with binder compounds such as nickel, manganese, zinc, or magnesium. Two major categories of binder compounds are manganese zinc (MnZn) and nickel zinc (NiZn).

The high-permeability material 268 may be placed either between or elsewhere in proximity to the magnetic coupling elements 264 and 266. The high-permeability material 268 may be used to increase and/or concentrate magnetic coupling between the magnetic coupling elements 264 and 266. The high permeability material 268 may increase the amount of flux transferred between the magnetic coupling elements 264 and 266. The high-permeability material 268 may be in the form of any of a variety of layers or structures in proximity to the magnetic coupling portions or elements 264 and 266.

The high permeability material 268 may also be used to control the readability of the RFID device 102 and thus to effect the deactivation method of the present invention. In embodiments where the high-permeability material 268 has high associated loss, the high-permeability material 268 may be used to intentionally de-tune and inhibit operation of the RFID device 102, except when the high-permeability material 30 is saturated by a direct-current magnetic field, such as a field produced by a printed magnet in the device 102. In such a configuration, the RFID device 102 may operate normally until exposed to a de-magnetizing field, which removes the bias of the high-permeability material 268. Thereafter, the high-permeability 268 may either de-tune the RFD device 102 or concentrate the magnetic flux away from the interposer 285, thereby also preventing reading of the RFID device 102.

Figure 21:
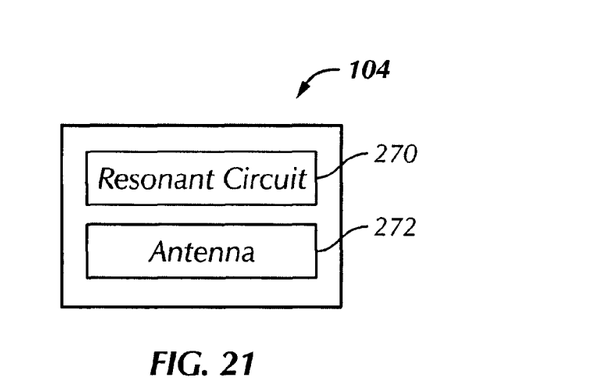
FIG. 21 schematically illustrates an embodiment of an EAS device.
Figure 22:
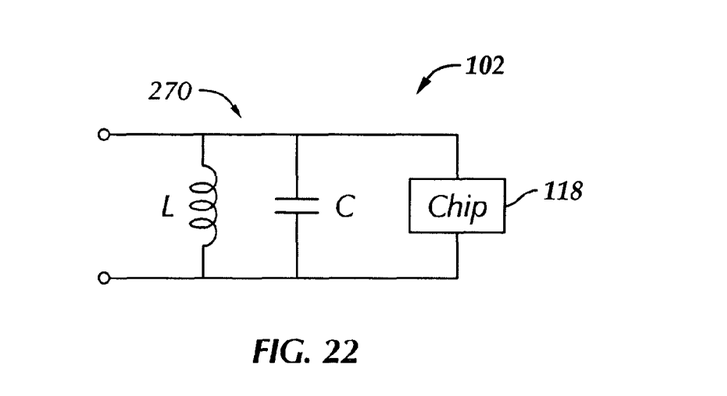
FIG. 22 schematically illustrates a resonant circuit in relation to an RFID chip.

Referencing FIG. 21, in a number of embodiments the EAS device 104 may include a resonant circuit 270 and an antenna 272. As illustrated in FIG. 22, the resonant circuit 270 may be schematically represented by an equivalence circuit including an inductive element L and a capacitive element C. The prior art includes numerous examples of resonant circuits that may be suitably utilized in EAS tags, either in parallel as shown or in series.

The capacitive element C may function both as a capacitor and as a transmission line depending upon the frequency. For example, at low frequencies (e.g., less than 10 MHz), the capacitive element C may function as or exhibit properties of a capacitor, while at ultra-high frequency (UHF) (e.g., about 300 MHz to 3 GHz), the capacitive element C may function as or exhibit properties of a transmission line. Accordingly, the capacitive element C is in an activated state when functioning as a capacitor and a deactivated state when functioning as a transmission line.

As represented in FIG. 22, the resonant circuit 270 may be configured in relation to the RFID chip 118 of the RFID device 102 so that the capacitive element C is in parallel with the chip. Accordingly, in UHF environments, the capacitive element C becomes a DC short circuit, thereby shorting and deactivating the RFID chip 118.

Those skilled in the art will understand that the preceding embodiments of the present invention provide the foundation for numerous alternatives and modifications thereto. These other modifications are also within the scope of the present invention. Accordingly, the present invention is not limited to that precisely as shown and described in the present invention.

What is claimed is:

1. A radio-frequency identification (RFID) and electronic article surveillance (EAS) tag comprising:
    an RFID device having an RFID chip for operating in a plurality of states including an activated state in which communication with a reader is enabled and a deactivated state in which communication with a reader is disabled;
    an EAS device for operating in a plurality of states including an activated state in which activation of an alarm is enabled and a deactivation state in which activation of an alarm is disabled;
    an active element in operative association with an antenna of the RFID device; and
    a structure for indicating whether the RFID device is in an activated state or deactivated state;
    wherein the RFID device is deactivated when the EAS device is deactivated by influencing the active element of the RFID device based on the activation state of the EAS device.

2. The RFID and EAS tag of claim 1 wherein the RFID device communicates with the reader in a far field.

3. The RFID and EAS tag of claim 1 wherein the structure comprises at least a colored section for visual indication.

4. The RFID and EAS tag of claim 3 wherein the structure further comprises a lens.

5. A product tagged for identification and surveillance, comprising:
    A radio-frequency identification (RFID) device having an RFID chip for operating in a plurality of states including an activated state in which communication with a reader is enabled and a deactivated state in which communication with a reader is disabled;
    an electronic article surveillance (EAS) device for operating in a plurality of states including an activated state in which activation of an alarm is enabled and a deactivation state in which activation of an alarm is disabled; and
    a structure for indicating whether the RFID device is in an activated state or deactivated state;
    wherein the RFID device is deactivated when the EAS device is deactivated by influencing an active element of the RFID device based on the activation state of the EAS device and the active element is in operative association with an antenna of the RFID device.

6. The product of claim 5 wherein the RFID device communicates with the reader in a far field.

7. The product of claim 5 wherein the structure comprises at least a colored section for visual indication.

8. The product of claim 7 wherein the structure further comprises a lens.

9. The product of claim 5 further comprising at least one tag associated with the product.

10. The product of claim 9 wherein the RFID device and the EAS device are on one tag.

11. The product of claim 9 wherein the RFID device is on a first tag (RFID tag) and the EAS device is on a second tag (EAS tag).

12. The product of claim 11 wherein the readability or operability of the RFID tag is disabled with the same apparatus that deactivates the EAS tag and at substantially the same time that the EAS tag is deactivated.

13. A product tagged for identification and surveillance, comprising:
    an radio-frequency identification (RFID) device having an RFID chip for operating in a plurality of states including an activated state in which communication with a reader is enabled and a deactivated state in which communication with a reader is disabled; and
    an electronic article surveillance (EAS) device for operating in a plurality of states including an activated state in which activation of an alarm is enabled and a deactivation state in which activation of an alarm is disabled;
    wherein the RFID device is deactivated when the EAS device is deactivated by influencing an active element of the RFID device based on the activation state of the EAS device, the deactivating of the RFID device comprising moving an active element of the RFID device from an active state in which the active element connects the RFID chip to an RFID antenna of the RFID device to a deactivated state in which the active element is moved to disconnect at least a portion of the RFID antenna from the RFID chip.

14. The product of claim 13 wherein the RFID device communicates with the reader in a far field.

15. The product of claim 13 further comprising a structure for indicating whether the RFID device is in an activated state or deactivated state.

16. The product of claim 15 wherein the structure comprises at least a colored section for visual indication.

17. The product of claim 16 wherein the structure further comprises a lens.

18. The product of claim 13 further comprising at least one tag associated with the product.

19. The product of claim 18 wherein the RFID device and the EAS device are on one tag.

20. The product of claim 18 wherein the RFID device is on a first tag (RFID tag) and the EAS device is on a second tag (EAS tag).

21. The product of claim 20 wherein the readability or operability of the RFID tag is disabled with the same apparatus that deactivates the EAS tag and at substantially the same time that the EAS tag is deactivated.

22. A radio-frequency identification (RFID) device comprising:

an RFID chip for operating in a plurality of states including an activated state in which communication with a reader is enabled and switchable to a deactivated state in which communication with a reader is disabled;

a lens;

colored sections selectively movable in and out of contact with the lens responsive to the switchable states of the RFID device to provide:

a first visual indicator for providing an indication of the state of the RFID device when the colored sections are not in contact with the lens; and a second visual indicator for providing a second indication of the state of the RFID device when the colored sections are in contact with the lens;

wherein the first visual indicator provides an indication of the activated state of the RFID device and the second visual indicator provides an indication of the deactivated state of the RFID device.

23. The RFID device of claim 22 wherein the RFID device communicates with the reader in a far field.

* * * * *